United States Patent [19]

Kaufman

[11] 3,881,248

[45] May 6, 1975

[54] WIRE CUT AND STRIP TOOLS

[75] Inventor: Harry Kaufman, New Rochelle, N.Y.

[73] Assignee: O.K. Machine and Tool Corporation, New York, N.Y.

[22] Filed: June 1, 1973

[21] Appl. No.: 366,123

[52] U.S. Cl. ............................................... 30/90.1
[51] Int. Cl. ............................................. H02g 1/12
[58] Field of Search ............ 81/9.5 R, 9.5 C; 30/90.1

[56] References Cited
UNITED STATES PATENTS

| | | | |
|---|---|---|---|
| 3,403,441 | 10/1968 | Eubanks | 30/90.1 |
| 3,532,011 | 10/1970 | Bradley | 81/9.5 C |

FOREIGN PATENTS OR APPLICATIONS

| | | | |
|---|---|---|---|
| 1,218,002 | 1/1971 | United Kingdom | 81/9.5 R |
| 1,910,639 | 9/1970 | Germany | 81/9.5 C |

*Primary Examiner*—Donald G. Kelly
*Assistant Examiner*—Roscoe V. Parker

[57] ABSTRACT

A hand tool for stripping the insulation from electrical wires is described. In one embodiment, a groove in a plate is sized to provide a first portion matched to the metal wire diameter for slicing through the insulation, and an adjacent second portion is provided sized to guide the insulated wire through the first portion. In another embodiment, a stripper and wire cutter are combined in a coaxial arrangement on a handle. A modification is useful for stripping TEFLON-coated wire.

16 Claims, 13 Drawing Figures

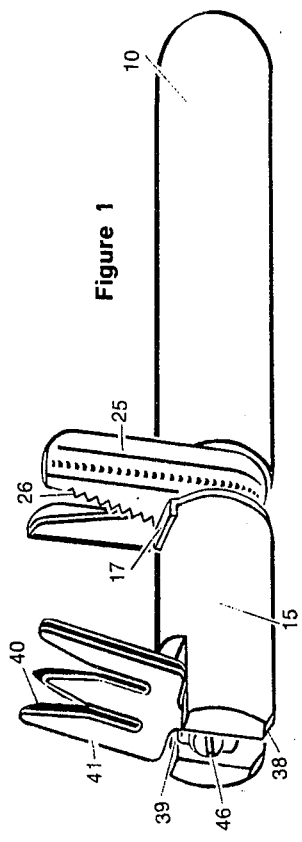
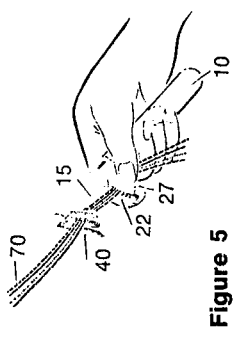
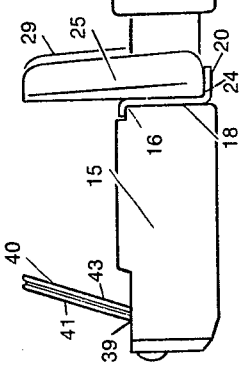
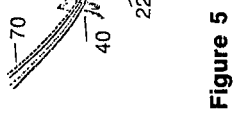
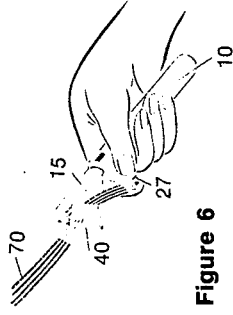
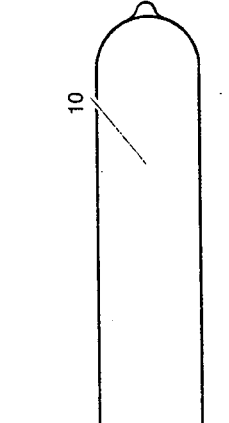
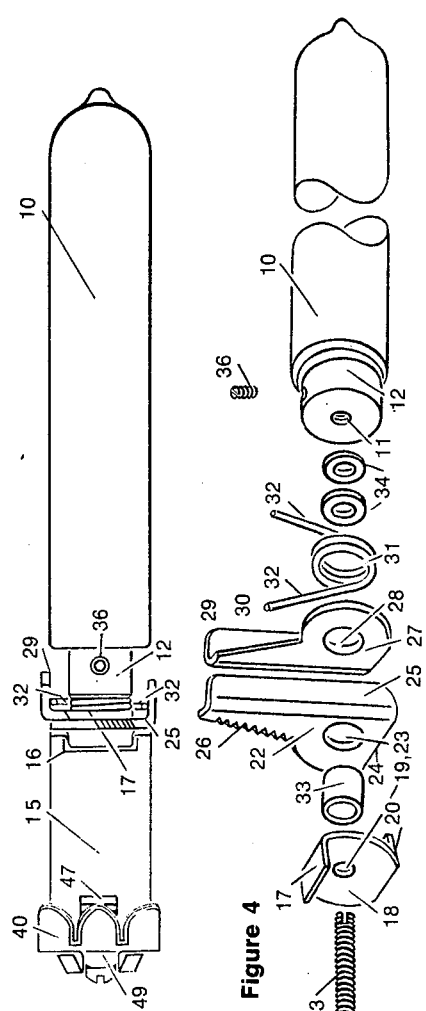
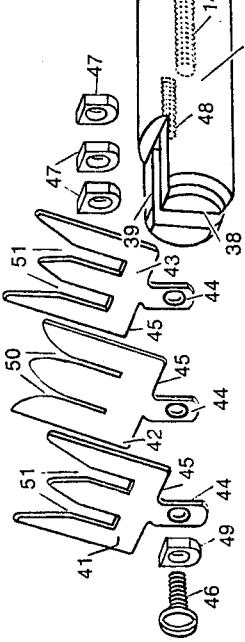

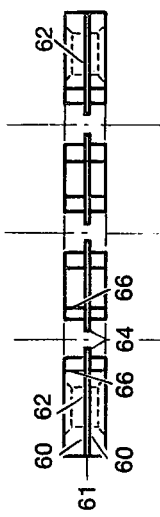
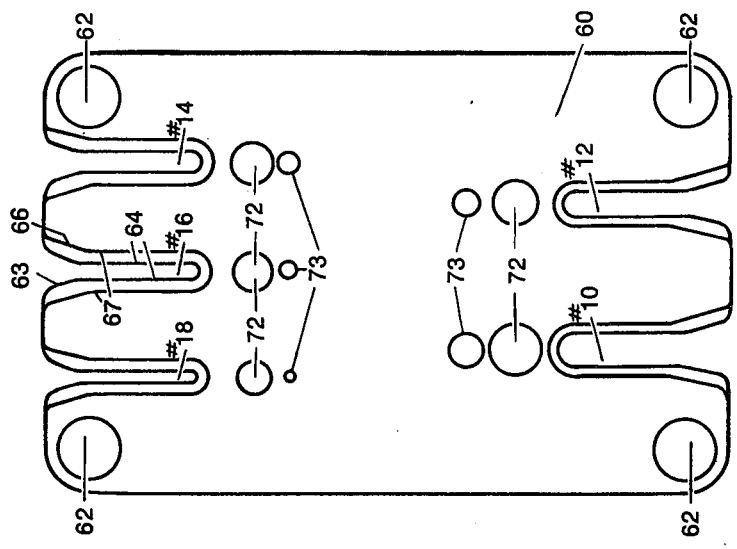
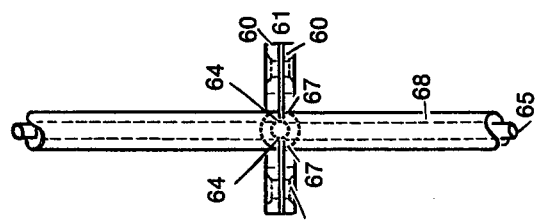
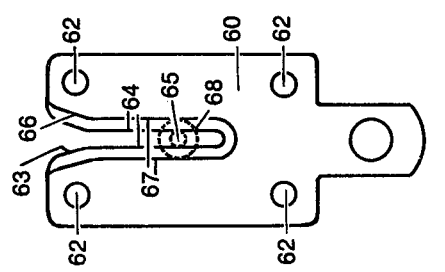

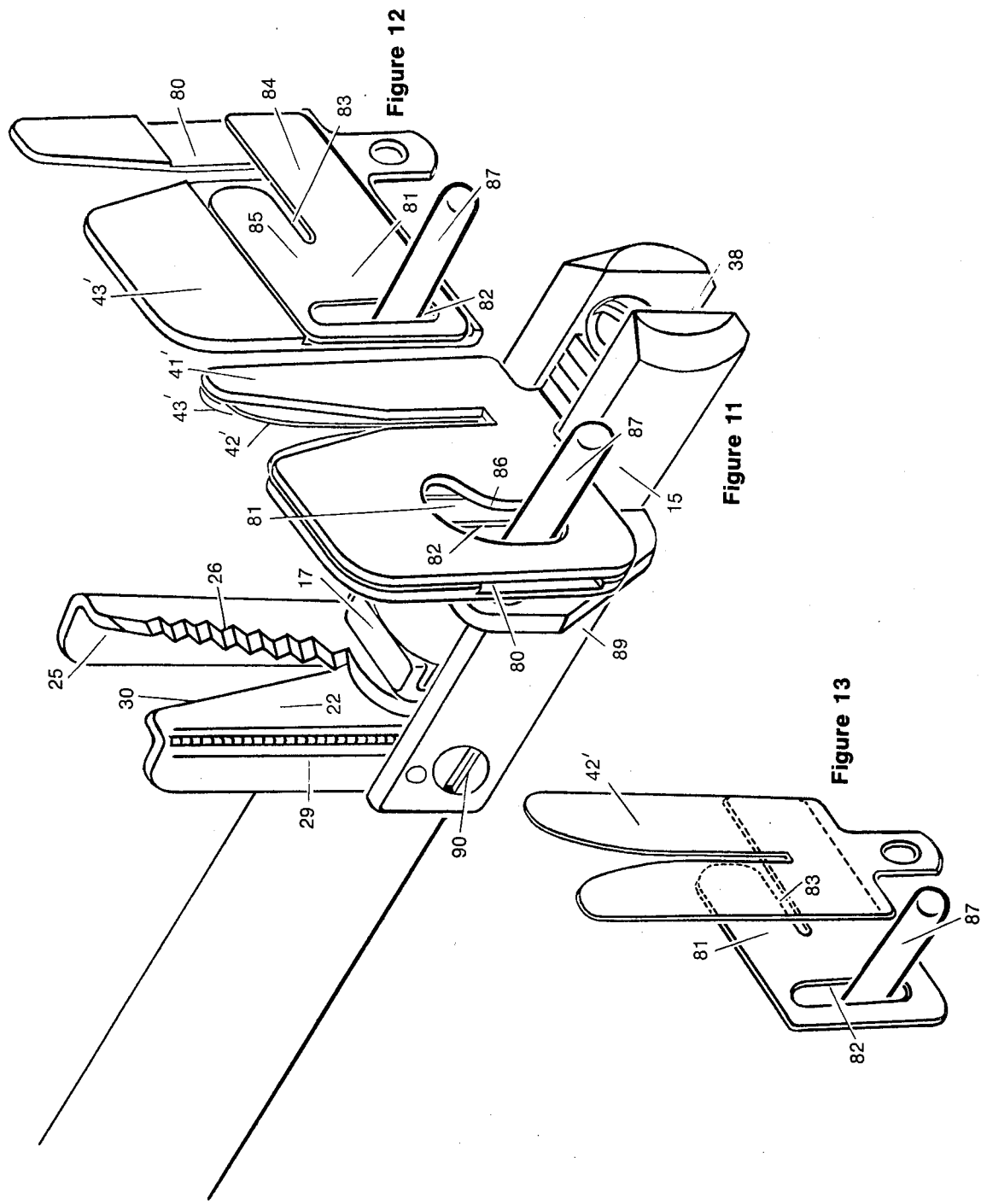

WIRE CUT AND STRIP TOOLS

This invention relates to hand tools for stripping insulation from electrical wires and for cutting wires.

There is a need in the art for wire stripping and cutting hand tools which are efficient, low cost, and of small size yet sturdy, of long life and useful for a wide variety of wire sizes and insulation thicknesses. Uses for such tools are found generally throughout the electronics and electrical appliance fields, and especially in the telephone field. With the advent of solderless wire-wrapped connections, which enables the rapid making of many wire connections to terminals, the time spent in stripping the insulation from the wire end occupies a major fraction of the connection making process. It has in addition placed more stringent requirements on the stripping tool in that more care must be exercised to avoid damaging the wire during the stripping process, such as by nicking or notching the wire side. Such wire damage reduces considerably the wire strength with the result that the wire can break during the wire wrapping process.

The main object of the invention is wire stripping and cutting tools capable of satisfying the foregoing requirements.

This is achieved in accordance with the invention by a wire stripping construction characterized by a stripping slot having parallel sides spaced apart a distance substantially equal to the diameter of the wire, and arranged adjacent the stripping slot is a guide portion which functions to maintain the insulated wire substantially perfectly aligned with the slot with the result that as the wire is pulled through the stripping slot the stripped bare wire remains perpendicular thereto at all times preventing damage to the wire.

In a preferred form of my invention, the wire stripper comprises a flat structure composed of three metal plates united together. The inner plate contains the stripping slot with parallel sides spaced apart the width of the metal wire. The two outer plates contain aligned wider slots formed by parallel sides spaced apart a distance equal to the diameter of the insulated wire. Each of the wider outer slots can serve to guide the insulated wire so that the bare wire passes directly through the center of the stripping slot.

In another form of my invention, a wire stripper is combined with a wire cutter to form a wire cutting and stripping tool. The tool is characterized by an elongated handle on whose end are mounted in spaced arrangement the wire stripper and wire cutting blades. The mounting arrangement is coaxial with the handle, and also features adjustment of the spacing between the two in order to control the length of bare wire for proper wire-wrapping use.

In a further modification, an additional insulation cutting blade is mounted for crosswise motion in the stripper for slicing the insulation on top and bottom in addition to both sides. This is especially useful for stripping TEFLON-covered wire.

These and further objects and advantages of the invention will be better understood from the description that follows hereinafter of several exemplary emobidments of the invention, taken in conjunction with the accompanying drawings wherein:

FIG. 1 is a perspective view of one form of cut and strip hand tool in accordance with the invention;

FIGS. 2 and 3 are side and top views, respectively, of the tool illustrated in FIG. 1;

FIG. 4 is an exploded view of the tool illustrated in FIG. 1;

FIGS. 5 and 6 are views illustrating operation of the tool of FIG. 1;

FIGS. 7 and 8 are elevational and end views respectively of one form of stripping hand tool in accordance with the invention, shown with a wire to illustrate its operation;

FIGS. 9 and 10 are elevational and end views, respectively, of a modified stripping hand tool;

FIGS. 11–13 are perspective views of a modification of the tool illustrated in FIG. 1.

FIGS. 1–4 illustrate one form of cutting and stripping tool in accordance with the invention, which is especially well adapted for easy and clean stripping of wires for wire-wrapping. It comprises a cylindrical handle 10 of plastic or plastic covered metal having a center threaded blind hole 11 extending inward from a short reduced diameter section 12. The handle hole 11 receives one end of a threaded rod or stud 13, the opposite end of which threadingly engages a center blind threaded hole 14 in a cylindrical metal extension piece or stripper support 15, which shares a common axis with the handle. The extension piece 15 on the side adjacent the handle has a flattened shoulder 16 on top for receiving the forward ear 17 of a Z washer 18 having a center hole 19 and a rearward ear 20, which bears against and fixes in position a gripper blade 22 having a center hole 23, a bottom edge 24 which bears against the rearward ear 20 of the Z washer, a flanged side 25 which can be held by the user, and a grooved gripping and cutting edge 26. Mounted adjacent the latter is a pivotable cutting blade 27 of similar configuration having a center hole 28, a flanged side 29 for manipulation by the thumb of the user, and a cutting edge 30 adapted to cooperate with the gripping edge 26 of the fixed gripper blade 22 to cut a wire. A spring 31 is mounted such that its arms 32 are held in the corners of the flanged sides 25 and 29 and biases the cutting blade 27 to its open position. The assembly also includes a hollow bushing 33, and two spacing washers 34. The parts just described are assembled by screwing the stud 13 into the extension piece 15, mounting the Z washer 18 on the stud and then the bushing 33, then placing the two blades 22, 27 and spring 31 on the bushing 33, then adding the washers 34 and screwing the handle 10 onto the free end of the stud 13, after which a set screw 36 is added to lock the handle to the stud.

The opposite end of the extension piece 15 has a deep slot 38 terminating on top in a shoulder or flat 39 lying in the same plane as that of the surface 16. The groove 38 receives a stripper 40, which comprises three plates 41, 42, 43, each having the shape of three upright fingers defining two adjacent slots and a depending supporting apertured lug 44 adapted to fit within the groove 38. The bottom edges 45 of the plates rests on the top flat 39. The plates are locked in position via a screw 46 which passes through the lug holes and several spacing washers 47 into a threaded blind hole 48. By changing the number of washers 47 between the groove 38 bottom and the stripper 40, the spacing between the latter and the cutter 22, 27 can be varied, which determines the length of the bare wire stripped of insulation. Extra washers can be located between the screw head and the stripper as shown at 49.

The stripper comprises two outer plates 41, 43 and one thinner inner plate 42, forming when assembled a sandwich arrangement constituting one stripping slot 50 and two centering guide slots 51. Only one guide slot is used in practice with this tool. The outer plates 41, 43 also serve to back-up the inner plate 42. As will be seen in FIG. 4, the stripper slots 50 are narrower than the guide slots 51. The principle of operation will be clearer with reference to FIGS. 7 and 8, wherein an embodiment of just a stripper tool is illustrated.

In FIGS. 7 and 8, two outer plates 60 and the thinner plate 61 are riveted together 62 to form a single stripping tool. As will be observed, the inner plate slot 63 has a widened opening narrowing to parallel slot walls 64 whose spacing is chosen to match the diameter of the wire core 65, and the outer plates 60 are thicker and having a similarly configured centering or guide slot 66 whose parallel walls 67 are spaced to match the diameter of the wire insulation 68. In operation, the wire is forced down into the slots as shown in FIG. 7, whereupon the inner plate 61 slices through the insulation 68 on opposite sides of the wire. A sufficiently thin hardened steel plate 61 will readily cut through the insulation and it will not be necessary to sharpen the slot walls 64. Then, the wire is pulled through from either side, stripping off the insulation 68 in the process. As will be noted, the insulated wire fitting closely within the outer guide slot 67 thus acts to compel the wire to move along an axis perpendicular to the plane of the plates and with the bare wire 65 exactly centered within the stripper slot 64. The result is to prevent nicking, notching or bending of the wire during stripping of the insulation.

The performance of the stripper in the tool of FIGS. 1-4 is the same as that depicted in FIGS. 7 and 8, with the sole difference that the tool is adapted to strip two different wire sizes. Also the slots are deep enough to strip several wires at a time.

FIGS. 5 and 6 show how easy it is to use the tool to cut and strip several wires at a time. Four insulated wires are shown at 70. With the tool held in an inverted position, the 4 wires as shown are placed in one of the grooves of the stripper 40 and between the cutter jaws. Next the movable cutting blade 27 is pivoted closed cutting off the wire ends, and then the tool as shown in FIG. 6 is pulled downward, stripping the insulation from the 4 wire ends.

FIGS. 9 and 10 show a modified stripper comprising at opposite edges grooves for stripping three and two wires respectively of the popular gauges, such as 10, 12, 14, 16 and 18. Corresponding parts bear the same reference numerals as in FIGS. 7 and 8. In addition, wire or gauge size holes are provided, a first set 72 to measure the insulated wire and a second set 73 to measure the bare wire ends for a particular wire. For instance, the top row of larger holes 72 represents the diameter of the insulated wire for the three wire sizes 18, 16 and 14, whereas the row of smaller holes 73 underneath measure the bare wire size for the respective wires. The holes help the user to quickly determine the correct groove to use in stripping a wire. Thus a very handy versatile tool of remarkable simplicity results. In using the tools illustrated in FIGS. 7-10 to strip hardened or toughened insulation, it may be useful to rotate the tool about the wire to sever the complete insulation circumference before pulling the wire through.

The stripping tool of the invention is especially useful for irradiated PVC insulated wire, because such insulation is stiff and very tough and difficult to strip with ordinary strippers. However with the stripper of the invention, wherein the stripper slot is carefully matched, for example, to within 0.001 inches of the wire diameter, and the guide groove is similarly matched within, for example, 0.001 inches of the insulation diameter, easy and clean stripping of even the toughest insulation is achieved and without risk of damaging the wire due to the accurate centering and guiding action effected on the wire by the insulation guiding slot which accurately lines up the wire with the center of the stripping slot. Thus the tool is especially useful for stripping wires for making wrapped connections. The stripping tool of the invention offers the additional advantage of low cost construction, since the several plates are readily made by simple stamping operations. The combined stripper and cutting tool offers the further advantage of ready adjustment in the spacing between the stripper and cutter. Also, the construction illustrated which provides a stright axis running through the center, and with the cutter pivotable about that common axis, and with the stripper and cutter extending to approximately the same height, makes for a tool which is efficient and rapid to operate by means of the downward chopping action as described and illustrated, and yet its slim design makes it ideal for storing in a belt holster or tool kit. Moreover, a long life is achieved, especially since the construction permits ready replacement of the stripper or cutter when worn.

Some wires used in telephony are insulated with TEFLON, which is particularly difficult to strip when the insulation is sliced through only along opposite sides. Rotating the tool form a slot completely around the circumference will avoid this difficulty, but this can be cumbersome with the tool illustrated in FIG. 1. FIGS. 11-13 illustrate a modification which avoids the need to rotate the tool. In these figures, corresponding parts bear the same reference numerals as in FIG. 1. FIG. 11 is a perspective view of the part of the tool extending frontwards from the cutter 22, 27. The stripper assembly remains the same except that the back plate 43' contains a recessed section 80 in which slides an additional insulation cutter blade 81. As shown in FIG. 12, which is a view from the front of the back plate 43' and additional cutter 81, the latter is a thin hardenered steel plate having a vertical slot 82 on the left and an open horizontal slot 83 on the right formed by a lower extension 84 which extends the full width of the stripper and an upper extension 85 having a rounded end and forming with the lower extension the stripping slot 83 having a vertical dimension approximately equal to the diameter of the metal part of the wire. The additional cutter extends between the back plate 43' and the center stripper blade 42'. FIG. 13 is a view of the latter and the additional cutter 81. All three stripper parts 41', 42', 43' have a curved slot 86 partly aligned with the vertical slot 82. Extending through both slots is a rod 87 rigidly connected by way of a support piece 89 to the bottom end of the pivotable cutter blade 29, as shown at 90. As will be evident, when the cutter blade 22 is closed by pivoting to the right in order to cut the wire, the rod 87 rotates in the slot 86, in which process the additional cutter 81 is driven crosswise to the right. When a wire is in the stripper slot, it is guided by the curved end of the upper extension 81 into the slot 83 in which process the insulation on top and bottom of the wire is sliced through in addition to its sides by the main stripper. Cutting of the insulation along four sides instead of two makes it possible to strip TEFLON-coated or like toughened insulation coated wires. The cutter blade 22 should be retained in its closed position until the insulation has been stripped off.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A hand tool for stripping insulation from an electrical wire, comprising a generally plate-like member having a groove extending inwardly from one edge of the member, said groove being defined by side walls of the member having a thickness direction generally perpendicular to the plane of the plate-like member, first side wall portions on opposite sides of one groove portion being parallel to one another and spaced apart by a distance substantially equal to the diameter of the metal part of the electrical wire to form a stripping slot capable of slicing through the insulation when the wire is forced down into the groove, second wall portions on opposite sides of said one groove portion and adjacent in the thickness direction said first side wall portions and being substantially parallel to one another and forming a centering slot aligned in the thickness direction with the stripping slot and having lateral dimensions such as to receive the insulated electrical wire and center and guide the metal part of the electrical wire as it passes through the stripping slot when the wire is pulled through the groove to strip the sliced insulation from one end of the wire.

2. A hand tool as claimed in claim 1 wherein the plate-like member comprises an assembly of a thin inner member sandwiched between thicker outer members.

3. A hand tool as claimed in claim 2 wherein the inner member contains a slot having a wider portion at the edge narrowing to form the said stripping slot, and the outer members each contains a slot having a wider portion at the edge narrowing to form the said centering slot, whose walls are spaced apart a distance substantially equal to the diameter of the insulation of the electrical wire.

4. A hand tool as claimed in claim 3 and further comprising fastening means for securing the inner and outer members together.

5. A hand tool as claimed in claim 4 wherein the plate-like member comprises plural spaced grooves of different sizes for stripping insulation from different sized wires, at least two of said grooves extending inwardly from the same one edge.

6. A hand tool as claimed in claim 5 wherein adjacent to but spaced from each groove are two different sized holes in the plate-like member, one of said holes being sized to match the diameter of the metal part of the wire accommodated by the adjacent groove, the other of said holes being sized to match the diameter of the insulation.

7. A hand tool as claimed in claim 1 and comprising an elongated handle having a central axis, a rod coaxially aligned with and having one end secured to one end of the handle, a wire cutter, means for mounting the wire cutter on the rod and adjacent to said one handle end, and means for mounting the said plate-like member on the rod and spaced from the cutter.

8. A hand tool for cutting an insulated electrical wire and then stripping a predetermined length of insulation off of the cut wire end, comprising an elongated handle having a central axis and a threaded hole, a threaded rod coaxially aligned with and having one end threadingly engaging the handle hole, a stripper support threadingly engaged at one end to the other end of the rod and having a said one end a first shoulder, an insulation stripper, a wire cutter having a gripping jaw and a pivotable cutting jaw, means for mounting the gripping and cutting jaws on the rod whereby the cutting jaw can be pivoted relative to the gripping jaw about an axis coaxial with the handle axis, means for aligning the cutter with the stripper and for fixing the position of the gripping jaw, said aligning and fixing means comprising a Z-shaped washer having a forward ear and a rearward ear, said Z-shaped washer being mounted on the rod with its forward ear engaging the first shoulder of the stripper support and with its rearward ear engaging the gripping jaw of the cutter, and means for mounting the insulation stripper at the other end of the stripper support and spaced the said predetermined length from the cutter.

9. A hand tool as claimed in claim 8 wherein means are provided for altering the spacing between the stripper and the cutter to thereby alter the length of insulation stripped from the wire.

10. A hand tool as claimed in claim 8 wherein the stripper support comprises at its other end a slotted second shoulder, and the stripper is mounted in the slot and engages the second shoulder.

11. A hand tool as claimed in claim 10 wherein the stripper comprises a plate-like member with upstanding fingers defining adjacent stripping and wire guiding slots and a depending lug portion for engaging the slotted second shoulder.

12. A hand tool as claimed in claim 11 wherein plural washers are provided sized to fit within the slot at the second shoulder, the number of washers located between the stripper lug and the slot bottom determining the spacing between the stripper and the cutter.

13. A hand tool as claimed in claim 12 wherein the stripper comprises inner and outer plates with aligned slots, the slot in the inner plate being sized to substantially match the wire diameter, the slot in the outer plates being sized to substantially match the insulation diameter.

14. A hand tool as claimed in claim 8 wherein the insulation stripper comprises a vertically extending groove for slicing through opposite sides of the insulation, and means for slicing through the top and bottom of the insulation.

15. A hand tool as claimed in claim 14 wherein the last-named means comprises an additional cutter blade having a horizontally extending slot, and means for driving the additional cutter blade crosswise to the vertically extending groove.

16. A hand tool as claimed in claim 15 and further comprising means operatively connecting the additional cutter blade to the wire cutter.

* * * * *